United States Patent [19]

Hayashi et al.

[11] Patent Number: 5,160,754
[45] Date of Patent: Nov. 3, 1992

[54] DOUGH OF PIE, ETC. HAVING A SLIT ROLL CONFIGURATION

[75] Inventors: Toshihiro Hayashi; Satoru Takeda; Shyoichiro Yamazaki; Masayuki Sugie; Norio Iwaki, all of Tokyo, Japan

[73] Assignee: Asahi Denka Kogyo Kabushiki Kaisha, Tokyo, Japan

[21] Appl. No.: 664,841

[22] Filed: Mar. 5, 1991

[30] Foreign Application Priority Data

Mar. 15, 1990 [JP] Japan ............................ 2-26616[U]
Mar. 15, 1990 [JP] Japan ............................ 2-26617[U]
Mar. 15, 1990 [JP] Japan ............................ 2-26618[U]

[51] Int. Cl.$^5$ ............................................ A21D 10/02
[52] U.S. Cl. .................................. 426/94; 426/283; 426/284; 426/503; 426/549; 426/556
[58] Field of Search ................. 426/94, 282, 283, 284, 426/503, 549, 556

[56] References Cited

U.S. PATENT DOCUMENTS

| | | | |
|---|---|---|---|
| 2,791,029 | 5/1957 | Henneberger | 426/503 |
| 2,960,045 | 11/1960 | Pentzlin | 426/284 |
| 4,293,572 | 10/1981 | Silva et al. | 426/19 |
| 4,427,703 | 1/1984 | Schafer et al. | 426/284 |
| 4,563,358 | 1/1986 | Mercer et al. | 426/94 |
| 4,569,848 | 2/1986 | Giorgetti et al. | 426/284 |
| 4,600,595 | 7/1986 | Svengren et al. | 426/94 |
| 4,618,498 | 10/1986 | Thulin | 426/94 |
| 4,618,499 | 10/1986 | Wainwright | 426/94 |
| 4,623,542 | 11/1986 | Wallin et al. | 426/94 |
| 4,748,031 | 5/1988 | Koppa | 426/284 |
| 4,910,030 | 3/1990 | Trojahn | 426/94 |

Primary Examiner—Jeanette Hunter
Assistant Examiner—Mary S. Mims
Attorney, Agent, or Firm—Young & Thompson

[57] ABSTRACT

In a dough of pie having a roll-like configuration and containing an ingredient in a crust of pie, a dough of pie having a slit roll configuration is provided with a plurality of slit-like cuttings formed on the entire surface of the crust of pie.

8 Claims, 3 Drawing Sheets

DOUGH OF PIE, ETC. HAVING A SLIT ROLL CONFIGURATION

BACKGROUND OF THE INVENTION

1. Field of the Invention

This invention relates to a dough of edible stuff having a slit roll configuration such as pie, bread, cracker, etc.

2. Description of the Prior Art

Among various kinds of known pies, breads and crackers, it is known that there are those which are formed of a crust of pie, a crust of bread or a crust of cracker enwrapping meat, fruit, or the like (hereinafter referred to as "ingredient") to form a rolled shape and those which are produced by baking thereof. Some of them are designed such that a part (that portion which forms an upper surface in baking) of a crust of pie, a crust of bread or a crust of cracker is provided with slit-like cuttings in order to prevent the ingredient from being ejected from an end face or end faces of a rolled crust or rolled dough owing to water vapor generated from the ingredient.

However, even in such crust of pie, crust of bread or crust of cracker as mentioned, there was the following inconvenience. That is, the water vapor generated from the ingredient acts not only to eject the ingredient from the end face or end faces but also to invade into the crust portion of such pie, bread or cracker to jeopardize a smooth passage of heat. As a result, passage of heat was insufficient particularly at the bottom portion of a pie, which often gave the eater a feeling something resembling to raw (or a feeling "not crispy"). Therefore, the water content of the ingredient was required to be reduced as much as possible.

Furthermore, when the ingredient containing moisture-abundant soft stuff such as gratin and sauce was used, the moisture and/or ingredient itself were leaked out from the end face portion and/or cutting port. Therefore, it was absolutely impossible to use this kind of ingredient.

The expression "slit roll configuration" when used herein in such a way as that a dough of pie, a dough of bread or a dough of cracker having a slit roll configuration refers to a roll-like configuration having a plurality of slits on the outer peripheral portion of a roll. Likewise, the expression "slit roll configuration" when used herein in such a way as that pie, bread or cracker having a slit roll configuration refers to a roll-like configuration having a mesh pattern of a plurality of enlarged slits formed on the outer peripheral portion of a roll.

SUMMARY OF THE INVENTION

It is therefore a first object of the present invention to provide a dough of pie, a dough of bread or a dough of cracker having a slit roll configuration in which the above-mentioned shortcomings are obviated. More specifically, the first object of the invention is to provide a dough of pie, a dough of bread or a dough of cracker having a slit roll configuration in which passage of heat is excellent at the bottom portion of the pie, etc. When the dough of pie, or the like is being baked and the dough of pie or the like becomes a pie, a bread or a cracker having a slit roll configuration and able to give a good feel to eat when baked.

A second object of the present invention is to provide a dough of pie, a dough of bread or a dough of cracker having a slit roll configuration which is capable of containing a moisture-abundant soft ingredient such as gratin and sauce.

The present invention has achieved the above-mentioned objects by providing in a dough of pie having a roll-like configuration and containing an ingredient in a crust of pie, a dough of pie having a slit roll configuration comprising forming a plurality of slit-like cuttings on the entire surface of said crust of pie.

The present invention has also achieved the above-mentioned objects by providing in a dough of bread having a roll-like configuration and containing an ingredient in a crust of bread, a dough of bread having a slit roll configuration comprising forming a plurality of slit-like cuttings on the entire surface of said crust of bread.

The present invention has also achieved the above-mentioned objects by providing in a cracker dough having a roll-like configuration and containing an ingredient in a crust of cracker, a dough of cracker having a slit roll configuration comprising forming a plurality of slit-like cuttings on the entire surface of said crust of cracker.

Examples of materials of the crust of pie, the crust of bread or the crust of cracker may include various types of doughs of pie crust, doughs of bread crust or doughs of cracker crust in addition to the normal stacked type doughs of pie crust, etc. Similarly, examples of the ingredients may include a moisture-abundant foodstuff such as sweet potato, salad, meat and the like. Especially, when a moisture-abundant soft ingredient such as gratin and sauce is used, it is desirable that the ingredient is contained in a film-like foodstuff and then enwrapped with a crust of pie, a crust of bread or a crust of cracker. Any edible film-like foodstuff can be used as the above-mentioned film-like foodstuff. Usually, a film-like foodstuff thinner than the above-mentioned dough of pie crust, dough of bread crust or dough of cracker crust is used. Foodstuff such as, for example, a crepe crust, a Harumaki (Chinese food) crust, a Gyoza (a fried dumpling stuffed with minced pork) crust, a dried bean curd, a collagen film, and a polysaccharide film can be used for the above-mentioned film-like foodstuff, etc.

By baking as it is, the dough of pie, the dough of bread or the dough of cracker having a slit roll configuration of the present invention can manufacture a pie, a bread or a cracker having a slit roll configuration. In addition, the dough of pie, the dough of bread and the dough of cracker of the present invention can be once frozen using a foodstuff refrigerator, it is stored, transported and distributed in its frozen state, and when in use, it is thawed and baked to obtain a pie, a bread or a cracker having a slit roll configuration.

Since the dough of pie, the dough of bread and the dough of cracker having a slit roll configuration of the present invention is provided with a plurality of slit-like cuttings formed on the entire surface thereof, even if moisture is contained in the ingredient, the cuttings are enlarged when baked and water vapor is emitted from any part of the pie crust, the bread crust or the cracker crust. As a result, passage of heat becomes good at the bottom portion of pie, the bottom portion of bread or the bottom portion cracker, there can be obtained a pie, a bread or a cracker having a slit roll configuration by baking, which does not give a feeling something resembling to raw (or a feeling "not crispy") to the eater. In other words, since the dough of pie, the dough of bread or the dough of cracker having a slit roll configuration of the present invention is good in passage of heat at the bottom portion thereof when it is being baked, and baking, there can be obtained a pie, a bread or a cracker having a slit roll configuration which can avoid a feeling something resembling to raw (or a feeling "not crispy").

In the dough of pie, the dough of bread or the dough of cracker having a slit roll configuration of the present invention, which comprises an ingredient and a film-like foodstuff enwrapping the ingredient, even if the cuttings are enlarged to form a mesh pattern by baking, leakage of the ingredient itself from the mesh pattern can be prevented by the film-like foodstuff. In other words, the dough of pie, the dough of bread or the dough of cracker comprising an ingredient and a film-like foodstuff enwrapping the ingredient is good in passage of heat at the bottom portion thereof when baking and by baking, it becomes a pie, a bread or a cracker having a slit roll configuration which can give an excellent feel to the eater. Furthermore, a water-abundant soft foodstuff such as gratin and sauce can be used as an ingredient.

DETAILED DESCRIPTION OF THE PREFERRED EMBODIMENT

A dough of pie having a slit roll configuration of the present invention will now be described in more detail by way of one preferred embodiment and with reference to the drawings.

Figure 1:
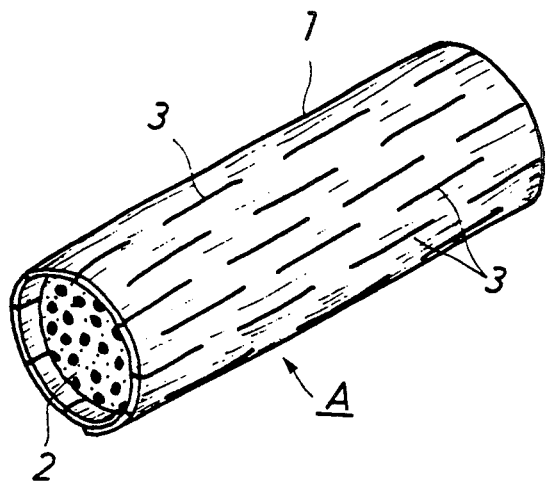
FIG. 1 is a perspective view of one embodiment of a dough of pie having a slit roll configuration of the present invention.

FIG. 1 is a perspective view of one embodiment of a pie dough A having a slit roll configuration of the present invention. In FIG. 1, the numeral 1 denotes a pie crust, which is rolled up to form a cylindrical configuration and contains an ingredient 2. The pie crust 1 is provided with a plurality of slit-like cuttings 3 formed on the entire surface thereof.

Figure 2:
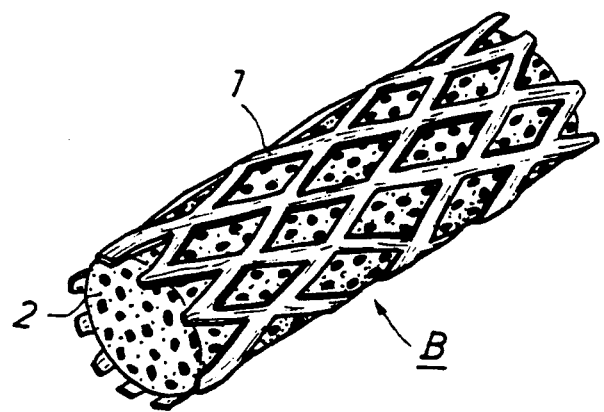
FIG. 2 is a perspective view of a pie having a slit roll configuration which is obtained by baking a dough of pie having a slit roll configuration of the present invention in an oven.

FIG. 2 is a perspective view showing a pie B having a slit roll configuration which is obtained by baking in an oven the pie dough A having a slit roll configuration of the present invention shown in FIG. 1. In the pie B having a slit roll configuration, the slit-like cuttings 3 are enlarged to form a mesh pattern.

Figure 3:
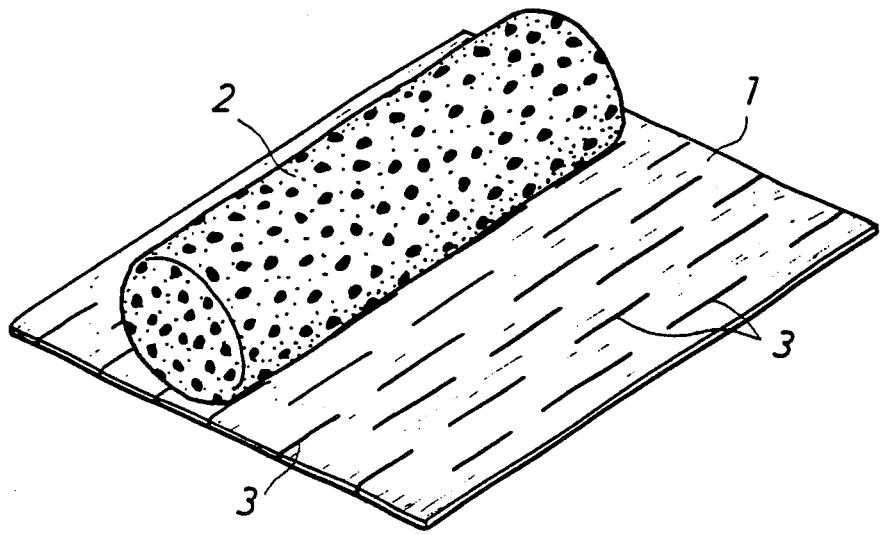
FIG. 3 is a perspective view showing a crust of pie provided with a plurality of slit-like cuttings formed thereon and with an ingredient placed thereon.
Figure 4:
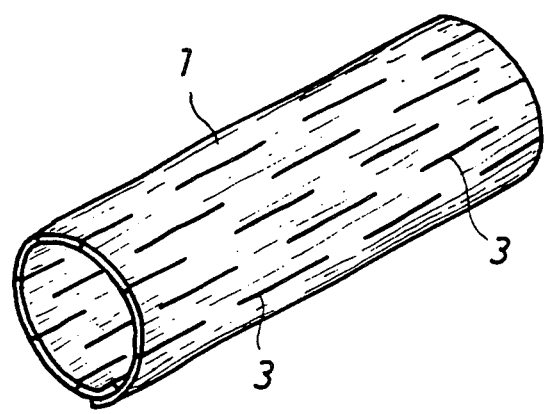
FIG. 4 is a perspective view showing a crust of pie provided with a plurality of slit-like cuttings formed thereon and rolled up to form a cylindrical configuration.

Examples of the method for producing the pie dough A of the present invention include a method which, as shown in FIG. 3, comprises the steps of placing a predetermined ingredient 2 on the pie crust 1 which is provided thereon with the cuttings 3 and then rolling up the pie crust 1 to enwrap the ingredient 2 therein, and a method which, as shown in FIG. 4, comprises the steps of rolling up the pie crust 1 to form a cylindrical configuration and then inserting the ingredient 2 therein.

Figure 5:
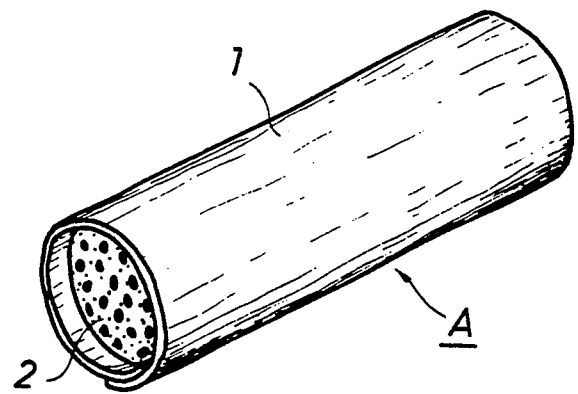
FIG. 5 is a perspective view showing a crust of pie having no slit-like cuttings thereon enwrapping an ingredient.

As for the slit-like cuttings 3 formed on the pie crust 1 in the pie dough A of the present invention, the slit-like cuttings 3 may be formed on the pie crust 1 beforehand as shown in FIGS. 3 and 4. Otherwise, the slit-like cuttings 3 may be formed only after the pie crust 1 containing the ingredient 2 is rolled up to form a cylindrical configuration as shown in FIG. 5.

Next, another pie dough having a slit roll configuration, in which the ingredient contained in the pie crust 1 is enwrapped with a film-like foodstuff, will be described with reference to the embodiment shown in FIGS. 6 through 8.

Figure 6:
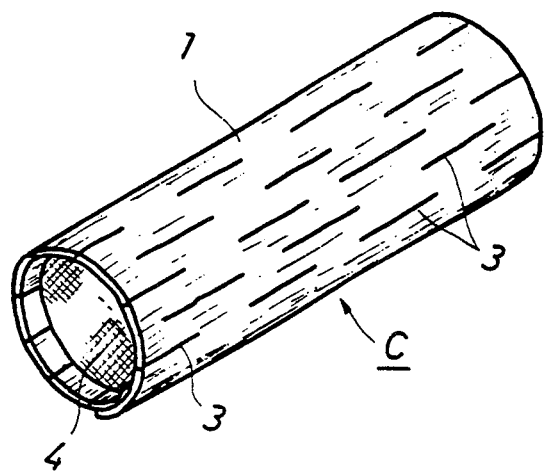
FIG. 6 shows another embodiment of a crust of pie having a slit roll configuration of the present invention and is a perspective view of a crust of pie having a slit roll configuration in which an ingredient enwrapped by a film-like foodstuff is used.
Figure 7:
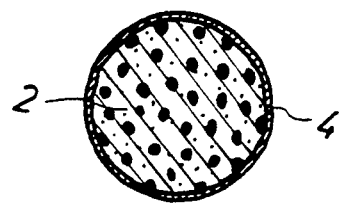
FIG. 7 is a sectional view of an ingredient enwrapped by a film-like foodstuff.

FIG. 6 is a perspective view showing one embodiment of a pie dough C having a slit roll configuration of the present invention, in which an ingredient enwrapped with a film-like foodstuff is used, and FIG. 7 is a sectional view of the ingredient 2 already enwrapped with the film-like foodstuff 4. In FIG. 6, the pie crust 1, as in the embodiment of FIG. 1, is provided with a plurality of slit-like cuttings 3 formed on the entire surface thereof. On the other hand, the ingredient 2 enwrapped with the pie crust 1 rolled up to form a cylindrical configuration is enwrapped with a film-like foodstuff 4 as shown in FIG. 7. FIG. 8 is a perspective view showing a pie D having a slit roll configuration obtained by baking in an oven the pie dough C having a slit roll configuration shown in FIG. 6. In this pie D having a slit roll configuration, a plurality of slit-shaped cuttings 3 are enlarged in a mesh pattern.

Figure 8:
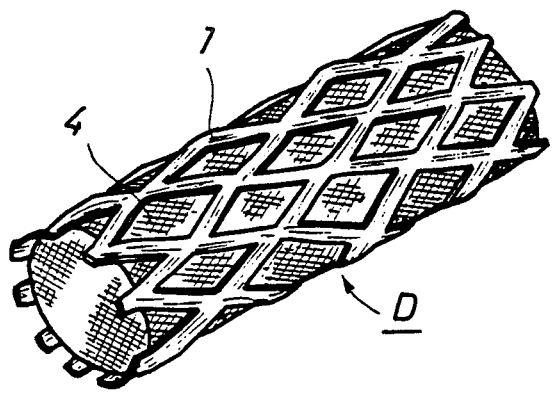
FIG. 8 is a perspective view of a pie having a slit roll configuration obtained by baking a dough of pie having a slit roll configuration of the present invention in an oven.

The method for producing a pie dough C and the method for forming a plurality of slit-like cuttings 3 on a pie crust 1, as employed in the embodiment shown in FIG. 1, can also be employed in the embodiment shown in FIGS. 6 through 8.

The pie crust can be suitably changed in size and thickness in accordance with the purpose. However, the size of the pie crust is preferably in the range of from 8.0 to 12.0 cm (lateral length, rolled length) by in the range of from 10 to 13 cm (vertical length), whereas the thickness of the pie crust is preferably in the range of from 1.5 to 3.0 mm. Similarly, the diameter of the rolled pie dough is preferably in the range from 2.0 to 3.5 cm.

Also, the way of arrangement of the cuttings can be suitably changed in accordance with the purpose. However, it is preferable that the cuttings are alternately arranged so that they form a continuous lattice of diamond shapes after baking as in the embodiment. More specifically, the cuttings are preferably arranged as follows.

The length of each cutting: 1.5~3.5 cm
The distance between adjacent cuttings in the peripheral direction: 0.7~1.3 cm
The number of cuttings in the peripheral direction: 2~5

The distance of adjacent cuttings in the parallel direction: 0.2~1.2 cm

The number of cuttings in the parallel direction: 8~14

Examples of the ingredient contained in a pie crust can be those which were heretofore used in this kind of foodstuff as mentioned above. However, sweet potatoes, pumpkins, bean jams, side dishes (including salads), processed foodstuffs such as gratins and curries, creams (custards, flour pastes and the like), and jams are particularly preferable.

The embodiments of the dough of bread crust having a slit roll configuration and the dough of cracker having a slit roll configuration can be explained in the exactly same way as the embodiment of the above-mentioned dough of pie having a slit roll configuration. However, in the case of a bread dough having a slit roll configuration, the thickness of the bread crust is preferably in the range of from 3.0~10.0 mm.

What is claimed is:

1. A pastry dough in a roll surrounding an ingredient which is a moisture-abundant foodstuff, and a film of foodstuff in which said ingredient is enwrapped, said film of foodstuff being disposed between said ingredient and said pastry dough, the pastry dough but not the film of foodstuff having a plurality of slits over the entire surface of said pastry dough, said film of foodstuff being permeable to water vapor whereby upon cooking, said slits enlarge to form a mesh pattern, said film of foodstuff preventing leakage of said ingredient through said mesh pattern.

2. A pastry dough as claimed in claim 1, in the form of a cylindrical sheath enclosing a cylindrical block of said ingredient.

3. A pastry dough as claimed in claim 2, in which said cylindrical sheath has an axis and said slits are parallel to said axis.

4. A pastry dough as claimed in claim 2, said cylindrical sheath being open at both ends.

5. A pastry dough as claimed in claim 1, which is frozen.

6. A pastry dough as claimed in claim 1, which is pie dough.

7. A pastry dough as claimed in claim 1, which is bread dough.

8. A pastry dough as claimed in claim 1, which is cracker dough.

* * * * *